March 16, 1971     N. H. BORTON     3,570,166
SPORT FISHING LURE
Filed Nov. 29, 1968
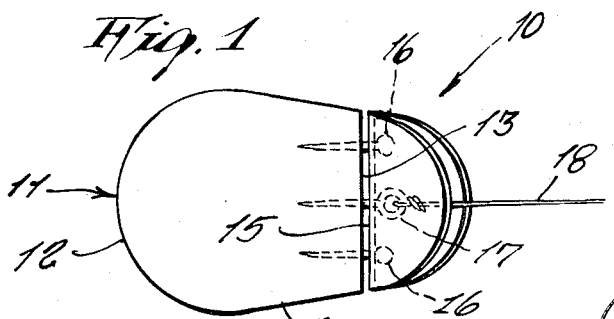
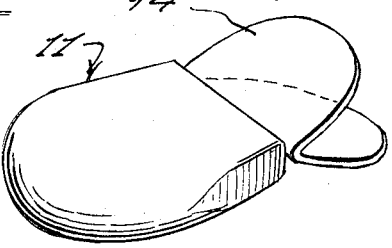
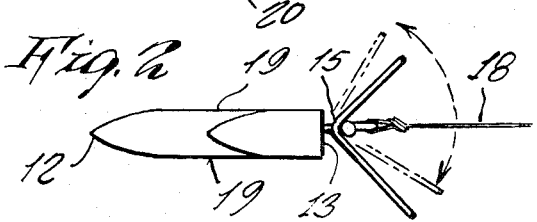
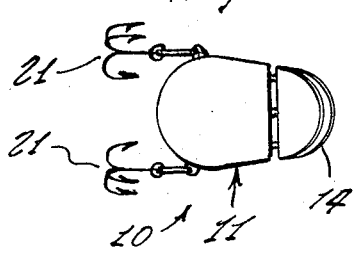
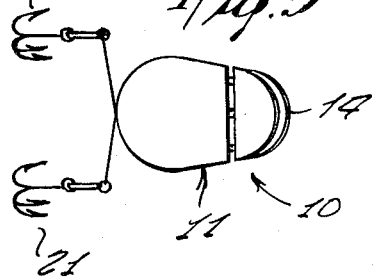
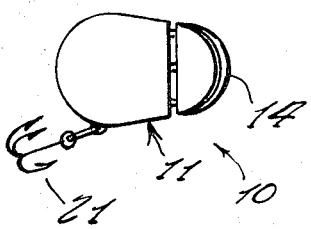
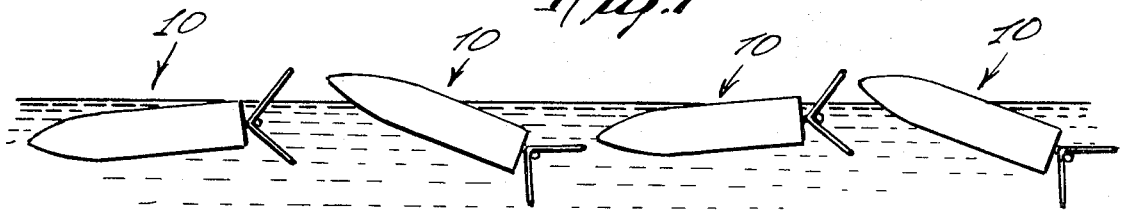
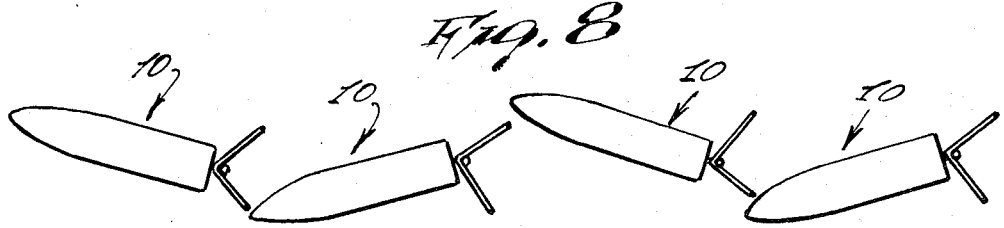
INVENTOR
NORMAN H. BORTON

United States Patent Office 3,570,166
Patented Mar. 16, 1971

3,570,166
SPORT FISHING LURE
Norman H. Borton, 554 Lake St.,
Adrian, Mich. 49221
Filed Nov. 29, 1968, Ser. No. 779,957
Int. Cl. A01k *85/00*
U.S. Cl. 43—42.03          1 Claim

ABSTRACT OF THE DISCLOSURE

A novel sport fishing lure having a unique new action in swimming, the lure comprising a relatively flat body having the appearance of a flat fish, such as a flounder, and the body having a pivotable scoop hingedly secured thereto so as to create an up-and-down swimming action.

---

This invention relates generally to fishing lures. More specifically, it relates to lures of the type such as are used by sports fishermen.

The principal object of the present invention is to provide a novel and improved fishing lure for sports fishing, the lure having self-contained means so to create an up-and-down swimming action.

Another object of the present invention is to provide an improved fishing lure which has a novel appearance of a flat fish such as a flounder or the like, and which accordingly could be termed as a fluke lure.

Yet another object of the present invention is to provide an improved fishing lure which incorporates a pivotable scoop at the front thereof so as to create the up-and-down swiming action which resembles the movements of a porpoise.

Other objects of the present invention are to provide an improved fishing lure which is simple in design, inexpensive to manufacture, rugged in construction, easy to use and efficient in operation.

These and other objects will be readily evident upon a study of the following specification and the accompanying drawing wherein:

FIG. 1 is a top plan view of the present invention,

FIG. 2 is a side elevation view thereof,

FIG. 3 is a perspective view thereof,

FIG. 4 is a plan view thereof with hardware attachment balanced to produce up-and-down swimming action, FIG. 5 is a plan view thereof showing a modified arrangement of the hardware shown in FIG. 4, FIG. 6 is a plan view thereof showing the hardware attachment to one side only so to cause the lure to swim on edge, FIG. 7 is a side view showing subsequent steps of movement of the lure in relation to a surface of the water, and FIG. 8 is a similar view thereof showing a swimming action which is side-to-side.

Referring now to the drawing in detail, the reference numeral 10 represents a fluke fishing lure, according to the present invention wherein there is a relatively flat body 11 so as to confrom to the shape of flat fish generally, the body 11 having a semi-circular rear edge 12 and a straight, transverse forward edge 13.

A scoop 14 made preferably from a circular piece of metal, has a bend 15 near its diametric center forming a pair of identical panels, the bend being provided with three spaced-apart openings, two of the openings receiving round head pins 16 and a central of the openings receiving a screw eye 17 to which one end of a fishing line 18 is secured. The roundhead pins and the screw eye are firmly secured to the body 11 and provided a means about which the scoop 14 is pivotable. Glass eye pins or similar devices may be used in substitution of the roundhead pins 16.

The body 11 includes flat upper and lower sides 19 and a peripheral side edge 20.

In operative use, as shown in FIG. 4 of the drawing, hardware attachments 21, including fishing hooks, are secured along the sides 20 in balanced relation so as to produce an up-and-down swimming action. In FIG. 5, a like situation is provided wherein the hooks are positioned further sidewardly. Actually, in FIG. 5 the hardware attachment is made to the rear semi-circular edge 12, whereas in FIG. 4, the attachment is made to the side edge 20. In FIG. 6, a hardware attachment is made to one side only so as to cause the lower edge to dip.

In operative use, it will thus be noted that the fluke lure may be variously used for up-and-down swimming action and to swim on edge. The scoop 14 may, if preferred, be made of plastic material and is made to be pivotable approximately twenty-five degrees, as is suggested by the phantom lines in FIG. 2 of the drawing.

The fluke lure may be fished in any number of sizes and types, weighted and balanced for surface, semi-surface, or bottom runner where it works equally as well. Hardware arrangements may be varied so to produce mutations in action. This may be from up-and-down to side-to-side. Strips of rubber, or rind, or small spinner blades attached to the rear of the fluke lure will add to the attractiveness of the lure.

While various changes may be made in the detailed construction, it is understood that such changes will be within the spirit and scope of the present invention as is defined by the appended claim.

What I now claim is:

1. In a sport fishing lure, the combination of a body and a scoop, said scoop being attached pivotally free to said body so to cause selectively an up-and-down swimming action and variations therefrom, said body comprising a relatively flat member having parallel flat upper and lower sides bounded by a semi-circular rear edge and a straight transverse forward edge, and side edges between said semi-circular rear edge and said transverse forward edge, said scoop comprising a member having two approximately semi-circular panels at right angles to each other, said panels being integral along a straight edge forming a corner therebetween, said corner having a plurality of three openings therethrough for receiving mounting means to said body, said scoop being positioned relative to said body with the said corner disposed adjacent to the transverse forward edge and the said panels extending angular forwardly therefrom, said mounting means comprising a pair of round head pins extending through the outer of said openings and secured to said body, and a single screw eye through the center opening and secured to said body, said scoop being pivotable relative to said body approximately 25 degrees, said pin and screw eye extending perpendicular to the transverse forward edge of said body so that said scoop movement is equidistant to either side thereof.

References Cited

UNITED STATES PATENTS

| | | | |
|---|---|---|---|
| 3,279,117 | 10/1966 | Weimer | 43—42.03 |
| 2,036,075 | 3/1936 | Peterson | 43—42.15X |
| 2,821,043 | 1/1958 | Parker | 43—42.15 |
| 2,775,839 | 1/1957 | Kuslich | 43—42.03 |

SAMUEL KOREN, Primary Examiner

D. J. LEACH, Assistant Examiner

U.S. Cl. X.R.

43—42.15